(12) United States Patent
Kuan

(10) Patent No.: US 12,516,706 B2
(45) Date of Patent: Jan. 6, 2026

(54) ROTATING SHAFT BRAKING STRUCTURE

(71) Applicant: Feng-Yu Kuan, Taichung (TW)

(72) Inventor: Feng-Yu Kuan, Taichung (TW)

( * ) Notice: Subject to any disclaimer, the term of this patent is extended or adjusted under 35 U.S.C. 154(b) by 545 days.

(21) Appl. No.: 18/122,127

(22) Filed: Mar. 16, 2023

(65) Prior Publication Data

US 2024/0309918 A1 Sep. 19, 2024

(51) Int. Cl.
| | | |
|---|---|---|
| *F16D 51/00* | (2006.01) | |
| *F16D 59/00* | (2006.01) | |
| *F16D 63/00* | (2006.01) | |
| *F16D 65/22* | (2006.01) | |
| *F16D 121/14* | (2012.01) | |

(52) U.S. Cl.
CPC ........... *F16D 59/00* (2013.01); *F16D 63/006* (2013.01); *F16D 65/22* (2013.01); *F16D 2121/14* (2013.01)

(58) Field of Classification Search
CPC .......... F16D 51/20; F16D 51/28; F16D 59/00; F16D 63/006; F16D 2125/28; F16D 2125/48; F16D 2129/046
See application file for complete search history.

(56) References Cited

U.S. PATENT DOCUMENTS

| | | | | |
|---|---|---|---|---|
| 11,312,266 | B2* | 4/2022 | Zhang | B60N 2/02246 |
| 2011/0094835 | A1* | 4/2011 | Winkler | F16D 51/20 |
| | | | | 192/105 CD |
| 2014/0069756 | A1* | 3/2014 | Esenwein | B24B 23/028 |
| | | | | 188/323 |
| 2015/0360589 | A1* | 12/2015 | Robinson | B60N 2/236 |
| | | | | 297/367 P |
| 2016/0053834 | A1* | 2/2016 | Tebay | F16D 51/12 |
| | | | | 188/75 |
| 2018/0017113 | A1* | 1/2018 | Cultraro | F16F 7/06 |

* cited by examiner

*Primary Examiner* — Nicholas J Lane
(74) *Attorney, Agent, or Firm* — Che-Yang Chen

(57) ABSTRACT

A rotating shaft braking structure includes a retaining member, having a shaft hole and an inner toothed portion; a rotating shaft pivoted in the shaft hole, including a shaft and an extension shaft having two drive blocks; two swing plates, engaged with the respective drive blocks, each swing plate having an outer toothed section and linking posts; a brake flywheel, having a receiving groove and four traction grooves, the extension shaft being pivoted to the brake flywheel so that the drive blocks abut against the receiving groove and the linking posts are engaged in the traction grooves; the brake flywheel being deflected at a predetermined angle for the outer toothed section to be engaged with or disengaged from the inner toothed portion; an adjustment wheel; and a torsion spring, disposed between the brake flywheel and the adjustment wheel, the torsion spring producing a torque on the brake flywheel.

10 Claims, 6 Drawing Sheets

ROTATING SHAFT BRAKING STRUCTURE

BACKGROUND OF THE PRESENT INVENTION

Field of Invention

The present invention relates to a rotating shaft braking structure, and more particularly to a rotating shaft structure having a brake flywheel with a large moment of inertia. When the rotational speed of a rotating shaft is too fast instantaneously and the rotation of the brake flywheel lags behind that of the rotating shaft and the brake flywheel is deflected, the braking effect is triggered automatically when the rotational speed is over the speed limit.

Description of Related Arts

A rotating shaft structure is widely used. It is often applied to wheels, retractors, folding furniture, fitness equipment, processing machinery, etc., to achieve the purposes of moving, retracting, pivoting, and steering. The rotating shaft of each of the above articles provides a rotation effect. However, when the rotating shaft is applied to articles, it does not always meet the requirement, namely, the faster the rotation, the better. For example, when the rotating shaft is applied to a rope retractor or a safety anti-falling device, if the rotational speed of the rotating shaft is too fast instantaneously, free fall may occur. When the rotating shaft is applied to a wheelchair, if the rotational speed of the rotating shaft of the wheel is too fast instantaneously, it may cause the danger of slipping down the slope. When the rotating shaft is applied to a circular saw machine, if the rotational speed of the rotating shaft of the saw arm is too fast instantaneously, dangerous sawing behavior may occur. For this reason, when the rotating shaft is rotated too fast instantaneously, how to brake the rotating shaft automatically to avoid dangers and how to adjust the upper limit of the rotational speed as required is the goal that the industry still needs to work on.

SUMMARY OF THE PRESENT INVENTION

In order to solve the foregoing problems, the primary object of the present invention is to provide a rotating shaft braking structure. The rotating shaft braking structure comprises a brake flywheel that rotates coaxially with a rotating shaft. The brake flywheel is subjected to the elastic force of a torsion spring, so that the deflectable brake flywheel abuts against the torsion spring in a direction same as the rotation direction of the rotating shaft. When the rotational speed of the rotating shaft is too fast instantaneously and the rotation of the brake flywheel with a large moment of inertia lags behind that of the rotating shaft, the brake flywheel resists the elastic force of the torsion spring, so that a swing plate is driven by the deflection relative to the rotating shaft for an outer toothed portion to be engaged with an inner toothed portion, and the braking effect is triggered automatically when the rotational speed is over the speed limit. By adjusting the elastic force applied by the torsion spring to the brake flywheel, the upper limit of the rotational speed for triggering the brake can be adjusted as required.

According to the forgoing object, a rotating shaft braking structure is provided. The rotating shaft braking structure comprises a retaining member, a rotating shaft, two swing plates, a brake flywheel, an adjustment wheel, and a torsion spring. The retaining member has a shaft hole and an inner toothed portion on an inner peripheral edge of the shaft hole. The rotating shaft includes a shaft at one side thereof and an extension shaft at another side thereof. The extension shaft has two opposite drive blocks extending radially. The drive block has a fulcrum portion on an outer end thereof. The rotating shaft is pivoted in the shaft hole. The two swing plates are arranged in a ring around the extension shaft. Each swing plate has a U-like shape. Each swing plate includes a support portion on an inner concave side thereof and an outer toothed section on an outer convex side thereof. The fulcrum portion is embedded in the support portion. The swing plate is confined within the inner toothed portion and has two ends able to swing freely about the fulcrum portion. Each swing plate further includes linking posts on two ends of one side of the swing plate. The linking posts extend in a direction same as the extension shaft. The brake flywheel has an inner side and an outer side. The inner side of the brake flywheel has a receiving groove and four traction grooves corresponding to the respective linking posts. The extension shaft passes through the receiving groove and is pivotally connected to the brake flywheel so that surfaces of the drive blocks are in contact with the receiving groove and the linking posts are engaged in the respective traction grooves. The receiving groove allows the brake flywheel to rotate forward and backward at a predetermined angle so that the traction grooves drive the respective linking posts for the outer toothed sections of the swing plates to be engaged with or disengaged from the inner toothed portion. The torsion spring includes a helical elastic ring, a first torsion arm and a second torsion arm. The first torsion arm and the second torsion arm extend from two ends of the elastic ring. The elastic ring of the torsion spring is arranged between the brake flywheel and the adjustment wheel. The first torsion arm is fixedly connected to the brake flywheel. The second torsion arm is fixedly connected to the adjustment wheel. The adjustment wheel is rotated for the torsion spring to generate a torque in the same rotation direction as the rotating shaft to the brake flywheel, and the adjustment wheel and the extension shaft are connected are connected together.

In one embodiment of the present invention, the outer convex side of each swing plate further has an arcuate section corresponding to the support portion. The outer toothed section and a curved section are provided at two sides of the arcuate section. The curvature of the arcuate section is greater than the curvature of the inner toothed portion. The curvature of the outer toothed section and the curved section is equal to the curvature of the inner toothed portion.

In one embodiment of the present invention, the outer side of the brake flywheel has a first annular groove and a first arm groove extending in a tangential direction of the first annular groove. One side of the adjustment wheel, facing the brake flywheel, has a second annular groove corresponding to the first annular groove and a second arm groove extending in a tangential direction of the second annular groove. The second arm groove is opposite to the first arm groove. The first torsion arm and the second torsion arm extend from the two ends of the elastic ring in a tangential direction of the elastic ring. The elastic ring is accommodated in the first annular groove and the second annular groove. The first torsion arm is accommodated in the first arm groove, and the second torsion arm is accommodated in the second arm groove.

In one embodiment of the present invention, the width of the receiving groove is greater than that of the drive block, and the cross-sectional area of the traction groove is greater than that of the linking post.

In one embodiment of the present invention, the drive blocks extend out of the shaft hole, and the fulcrum portion is located within the inner toothed portion.

In one embodiment of the present invention, one side of the adjustment wheel, facing away from the brake flywheel, is provided with a scale.

In one embodiment of the present invention, the extension shaft has a screw hole at one end thereof. The adjustment wheel has a central through hole. A bolt passes through the through hole and is screwed to the screw hole for locking the adjustment wheel and the extension shaft.

In one embodiment of the present invention, the fulcrum portion is in an arc shape.

In one embodiment of the present invention, the rotating shaft includes a pivot bearing. The shaft is arranged at one side of the pivot bearing. The extension shaft and the drive blocks are arranged at another side of the pivot bearing. The pivot bearing is assembled in the shaft hole.

In one embodiment of the present invention, a center of the brake flywheel is provided with a deflection bearing. A perforation is defined in the receiving groove. The perforation communicates with the deflection bearing. The extension shaft passes through the perforation and is coupled to the deflection bearing. The first annular groove is arranged around the deflection bearing.

According to the forgoing, the brake flywheel has a set moment of inertia, so that the rotational speed of the rotating shaft is too fast instantaneously, causing the brake flywheel to lag and deflect, and then the swing plates are driven to be engaged with the inner toothed portion, so as to achieve automatic stop by braking when the speed exceeds the limit. The upper limit of the speed to trigger the brake can be adjusted according to the needs.

DETAILED DESCRIPTION OF THE PREFERRED EMBODIMENT

Figure 1:
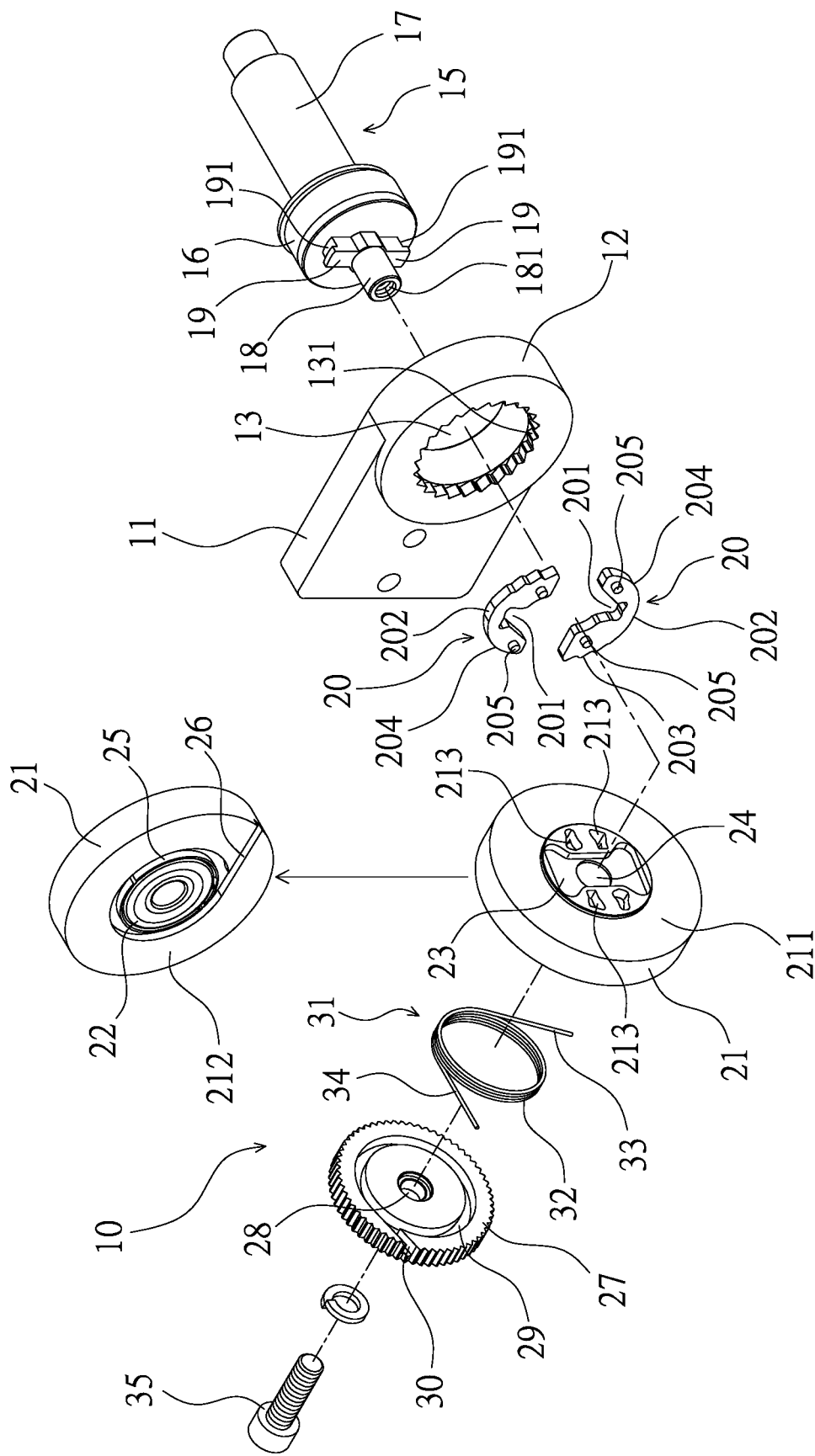
FIG. 1 is an exploded view of the present invention.

Embodiments of the present invention will now be described, by way of example only, with reference to the accompanying drawings.

Referring to FIG. 1 through FIG. 5, a rotating shaft structure 10 comprises a retaining member 11, a rotating shaft 15, two swing plates 20, a brake flywheel 21, an adjustment wheel 27, and a torsion spring 31.

The retaining member 11 incudes a shaft mounting portion 12. The shaft mounting portion 12 has a shaft hole 13. An inner toothed portion 131 is provided on the inner peripheral edge of one side of the shaft hole 13.

The rotating shaft 15 includes a pivot bearing 16, a shaft 17 at one side of the pivot bearing 16, and an extension shaft 18 at the other side of the pivot bearing 16. The extension shaft 18 has a screw hole 181 at one end thereof. The junction of the extension shaft 18 and the pivot bearing 16 is provided with two opposite drive blocks 19 extending radially. The outer end of the drive block 19 is recessed to form a fulcrum portion 191 in an arc shape. The pivot bearing 16 of the rotating shaft 15 is assembled in the shaft hole 13, so that the shaft 17, the extension shaft 18 and the drive blocks 19 become a whole and can be rotated freely. After assembled, the drive blocks 19 extend out of the shaft hole 13, and the fulcrum portion 191 is located within the inner toothed portion 131.

The two swing plates 20 are arranged in a ring around the extension shaft 18. The swing plate 20 has a U-like shape. The swing plate 20 includes a support portion 201 on its inner concave side. The fulcrum portion 191 of the drive block 19 is engaged in the support portion 201. The outer convex side of the swing plate 20 has an arcuate section 202 corresponding to the support portion 201. An outer toothed section 203 and a curved section 204 are provided at two sides of the arcuate section 202. The curvature of the arcuate section 202 is greater than the curvature of the inner toothed portion 131. The curvature of the outer toothed section 203 and the curved section 204 is equal to the curvature of the inner toothed portion 131. The swing plate 20 is confined within the inner toothed portion 131 and abuts against one side of the pivot bearing 16 so that two ends of the swing plate 20 are free to swing. The swing plate 20 further includes two linking posts 205 on two ends of one side of the swing plate 20 facing away from the pivot bearing 16. The swing plate 20 is configured to swing left and right for the outer toothed section 203 to be engaged with or disengaged from the inner toothed portion 131.

The brake flywheel 21 has an inner side 211 and an outer side 212. The center of the brake flywheel 21 is provided with a deflection bearing 22. The inner side 211 has a receiving groove 23 and a perforation 24 communicating with the deflection bearing 22. The inner side 211 further has four traction grooves 213 corresponding to the respective linking posts 205. The inner side 211 faces the shaft hole 13. The extension shaft 18 passes through the perforation 24 and is coupled to the deflection bearing 22, so that the surfaces of the drive blocks 19 are in contact with the receiving groove 23, and the linking posts 205 are engaged in the respective traction grooves 213. The width of the receiving groove 23 is greater than the width of the drive block 19. The cross-sectional area of the traction groove 213 is greater than that of the linking post 205, so that the receiving groove 23 allows the brake flywheel 21 to rotate forward and backward at a predetermined angle. The traction grooves 213 drive the respective linking posts 205 for the outer toothed sections 203 of the swing plates 20 to be engaged with or disengaged from the inner toothed portion 131. The outer side 212 of the brake flywheel 21 has a first annular groove 25 around the deflection bearing 22 and a first arm groove 26 extending in the tangential direction of the first annular groove 25.

The adjustment wheel 27 has a central through hole 28. One side of the adjustment wheel 27 has a second annular groove 29 corresponding to the first annular groove 25 and a second arm groove 30 extending in the tangential direction of the second annular groove 29. The second arm groove 30 is opposite to the first arm groove 26.

The torsion spring 31 includes a helical elastic ring 32, a first torsion arm 33, and a second torsion arm 34. The first torsion arm 33 and the second torsion arm 34 extend from two ends of the elastic ring 32 in the tangential direction of the elastic ring 32. The torsion spring 31 is arranged between the brake flywheel 21 and the adjustment wheel 27. The elastic ring 32 is accommodated in the first annular groove 25 and the second annular groove 29. The first torsion arm 33 is accommodated in the first arm groove 26, and the second torsion arm 34 is accommodated in the second arm groove 30. A bolt 35 passes through the through hole 28 of the adjustment wheel 27 and is screwed to the screw hole 181 of the extension shaft 18. The adjustment wheel 27 is rotated for the torsion spring 31 to apply an elastic force to the brake flywheel 21 in a direction same as the rotation direction of the rotating shaft 15. Then, the adjustment wheel 27 is locked, so that the adjustment wheel 27 and the extension shaft 18 are connected together, and the torsion spring 31 generates a set torque to the brake flywheel 21. According to the forgoing, the brake flywheel 21 of the rotating shaft structure 10 has a set moment of inertia. The larger the moment of inertia, the more difficult it is to rotate. When the rotational speed of the rotating shaft 15 is too fast instantaneously to result in that the rotational speed of the brake flywheel 21 lags behind that of the rotating shaft 15 and the brake flywheel 21 is deflected, the swing plates 20 are driven to be engaged with the inner toothed portion 131, so as to achieve an automatic stop effect by braking when the rotational speed is over the speed limit. The upper limit of the rotational speed to trigger the brake can be adjusted according to the needs.

Figure 4:
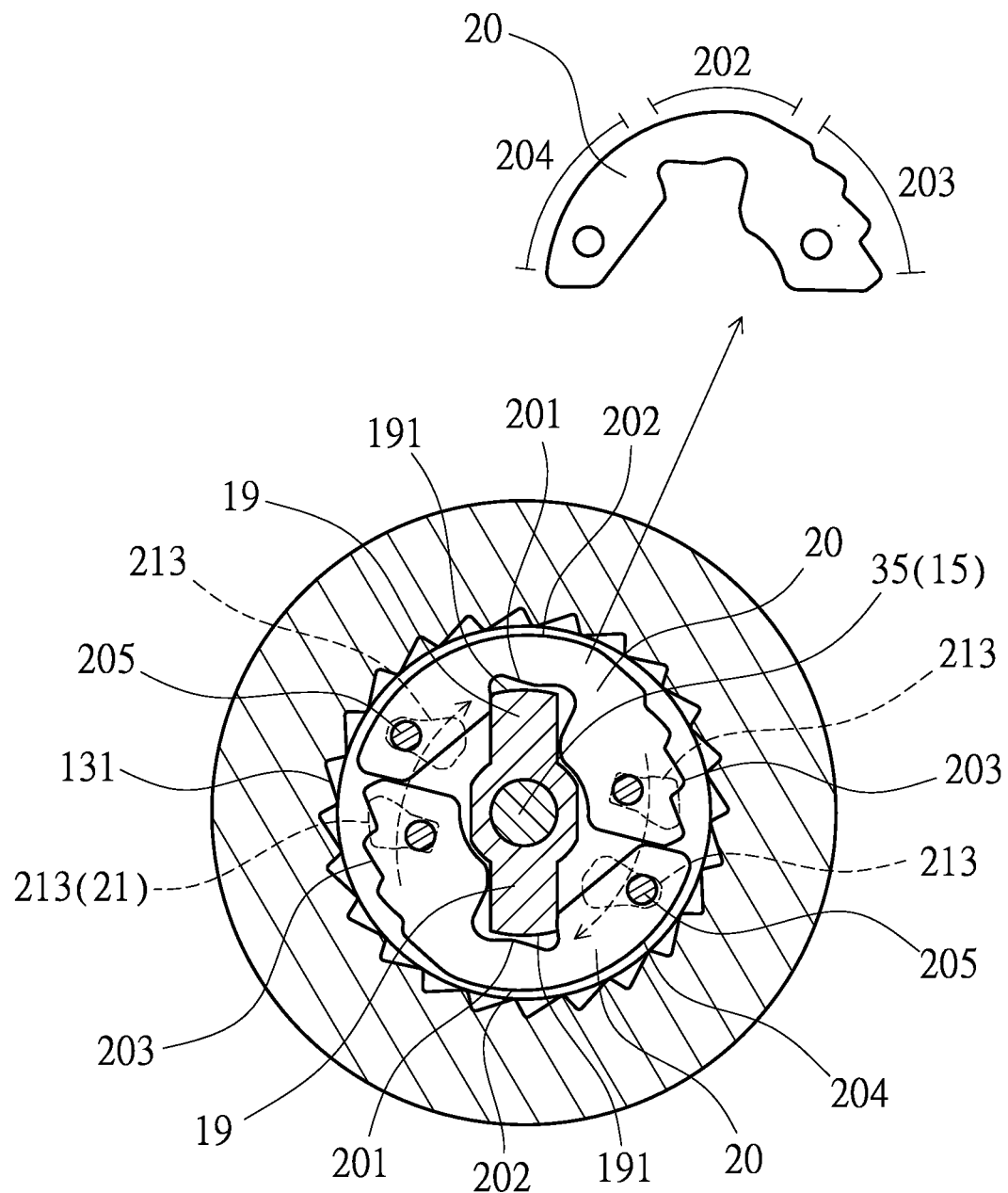
FIG. 4 is a schematic sectional view of the present invention, wherein the brake flywheel is rotated synchronously with the rotating shaft.
Figure 5:
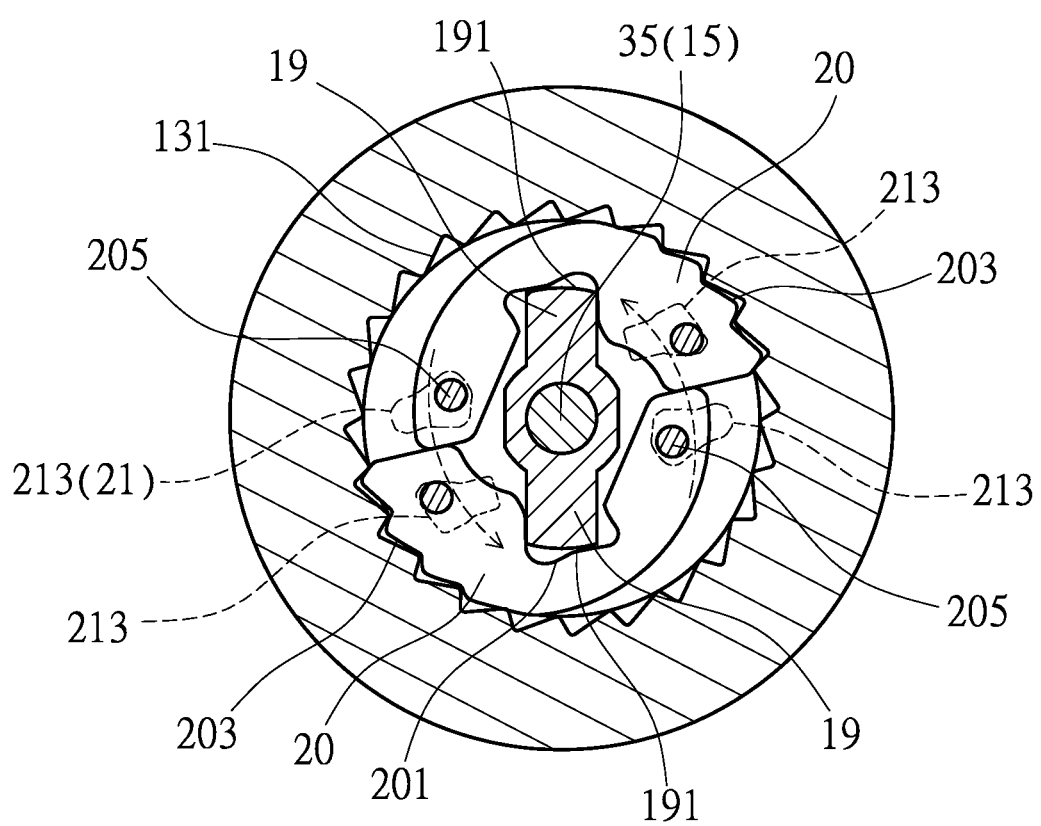
FIG. 5 is a schematic sectional view of the present invention, wherein the instantaneous rotational speed of the brake flywheel lags behind that of the rotating shaft.

The assembly, function and effect of the above-mentioned embodiment are described below. As shown in FIGS. 1 to 5, the present invention uses the torsion spring 31 to apply a set torque to the brake flywheel 21, and the brake flywheel 21 has a set moment of inertia. The greater the mass of the brake flywheel 21, the greater the moment of inertia, that is, applying the same thrust achieve the same speed. The heavier the brake flywheel 21, the longer it takes. According to the physical formula, angular acceleration ($\alpha$)=moment ($\tau$)/moment of inertia (I). The torque applied by the torsion spring 31 and the moment of inertia of the brake flywheel 21 enable the brake flywheel 21 to accumulate a set energy of angular acceleration ($\alpha$). In other words, through the design and cooperation of the torque of the torsion spring 31 and the moment of inertia of the brake flywheel 21, the energy can make the brake flywheel 21 obtain the required angular acceleration. In detail, if the moment is increased or the moment of inertia is reduced, the angular acceleration will be accelerated; if the moment is reduced or the moment of inertia is increased, the angular acceleration will be decelerated. Therefore, the required angular acceleration setting value can be achieved by adjusting the values of the moment or moment of inertia of the brake flywheel 21. In the present invention, the braking effect is triggered automatically based on the angular acceleration produced by the braking flywheel 21, and is compared with the angular acceleration of the rotation of the rotating shaft 15. If the torsion spring 31 has the maximum torque after being deflected and compressed by the brake flywheel 21, at this time, the moment can produce the greatest angular acceleration to the brake flywheel 21. When the angular acceleration of the rotating shaft 15 rotated by an external force is less than or equal to the angular acceleration set by the brake flywheel 21 as shown in FIG. 4, the rotation of the brake flywheel 21 is synchronized with the rotation of the rotating shaft 15. When the angular acceleration of the rotating shaft 15 rotated by an external force is greater than the angular acceleration set by the braking flywheel 21 as shown in FIG. 5, that is, the rotational speed of the rotating shaft 15 increases suddenly, the rotation of the brake flywheel 21 will lag behind the rotation of the rotating shaft 15, and the brake flywheel 21 will be deflected reversely relative to the rotating shaft 15, so that the traction grooves 213 of the brake flywheel 21 drive the linking posts 205 at the left and right ends of the swing plate 20, and the support portion 201 swings with the fulcrum portion 191 of the drive block 19 as a fulcrum. The fulcrum portion 191 in an arc shape makes the swing plate 20 swing smoothly, without jamming, for the outer toothed section 203 to be engaged with the inner toothed portion 131 of the shaft mounting portion 12. In this way, the drive blocks 19 of the rotating shaft 15 are restricted by the inner toothed portion 131 so that they cannot rotate. When the rotating shaft 15 rotates over the set speed, a braking effect is generated to stop rotation of the rotating shaft 15 automatically. When the rotating shaft 15 stops, its angular acceleration is equal to zero. The brake flywheel 21 is continuously subjected to the torque of the torsion spring 31, so that the brake flywheel 21 has an angular acceleration exceeding that of the rotating shaft 15 to rotate forward. At this time, the brake flywheel 21 is deflected forward relative to the rotating shaft 15, so that the traction grooves 213 of the brake flywheel 21 drive the linking posts 205 at the left and right ends of the swing plate 20, and the support portion 201 swings with the fulcrum portion 191 as a fulcrum, so that the outer toothed section 203 is disengaged from the inner toothed portion 131. In this way, the rotating shaft 15 releases the brake and returns to the normal rotatable state, as shown in FIG. 4. When the angular acceleration of the rotating shaft 15 is less than or equal to the set angular acceleration of the brake flywheel 21, the rotating shaft 15 continues to rotate synchronously with the brake flywheel 21.

It is worth mentioning that turning the adjustment wheel 27 can adjust the elastic force applied by the torsion spring 31 to the brake flywheel 21, that is to say, the torque of the pre-applied force on the brake flywheel 21 can be changed. Therefore, the generated angular acceleration can be changed according to the needs, and the upper limit of the instantaneous rotational speed of triggering the brake can be adjusted. One side of the adjustment wheel 27, facing away from the brake flywheel 21, is provided with a scale. The scale may be in units of rotational speed, angular acceleration, angular velocity, second speed, hourly speed, torque, etc., for the adjustment wheel 27 to adjust the elastic force applied by the torsion spring to the brake flywheel 21, so as to achieve the effect of quick setting.

Figure 2:
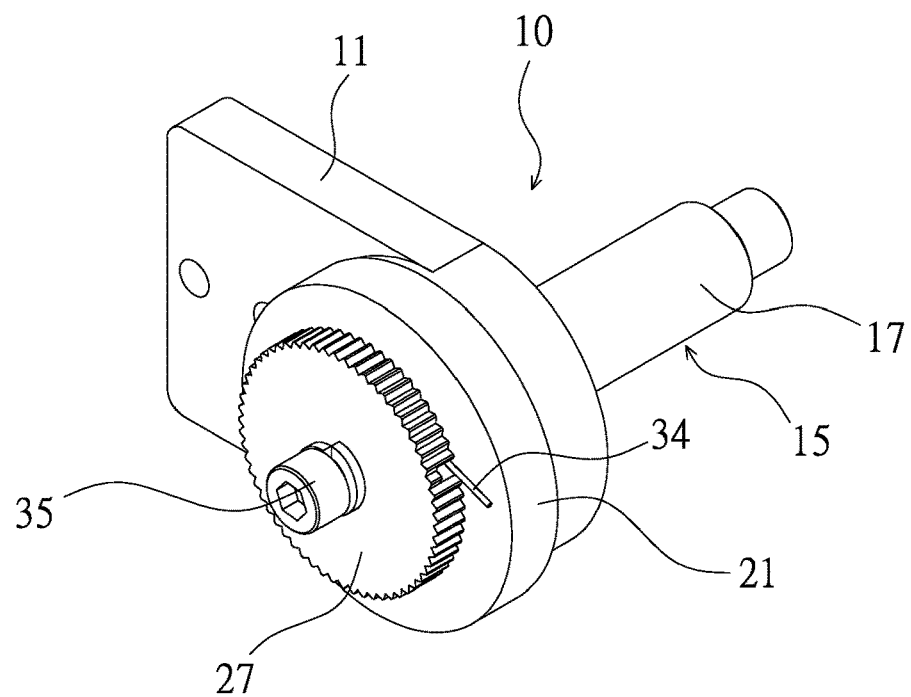
FIG. 2 is a perspective view of the present invention.
Figure 3:
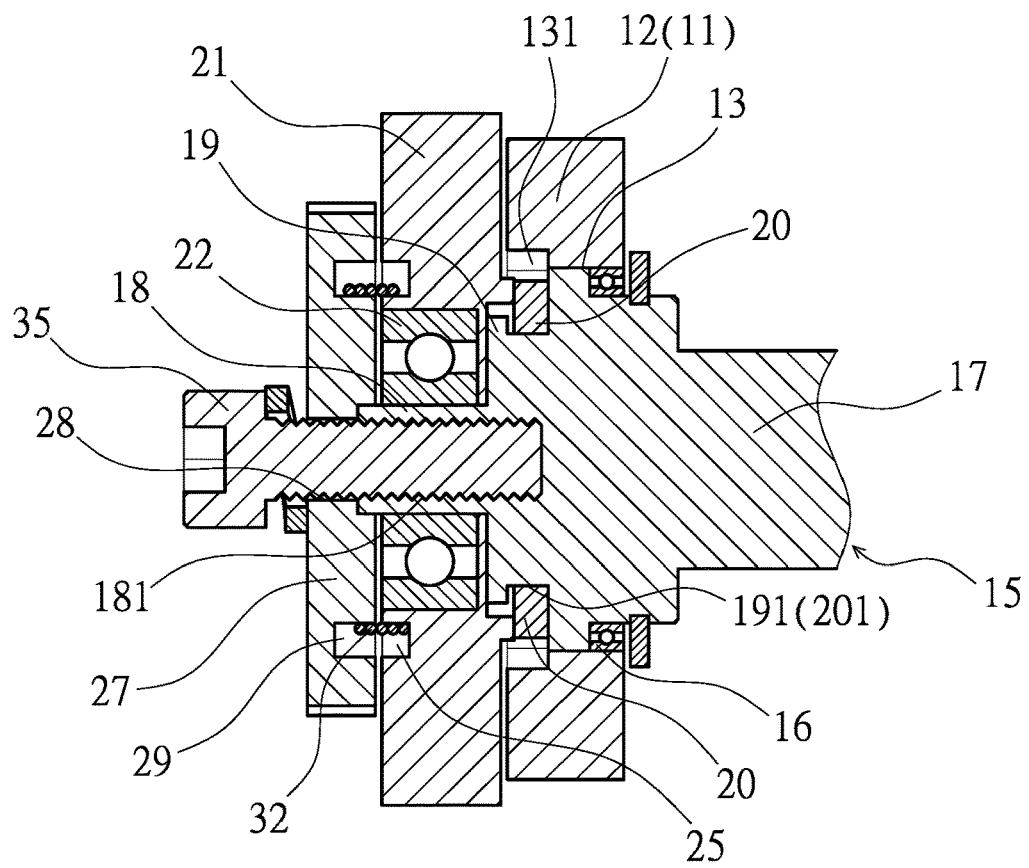
FIG. 3 is a side sectional view of the present invention.
Figure 6:
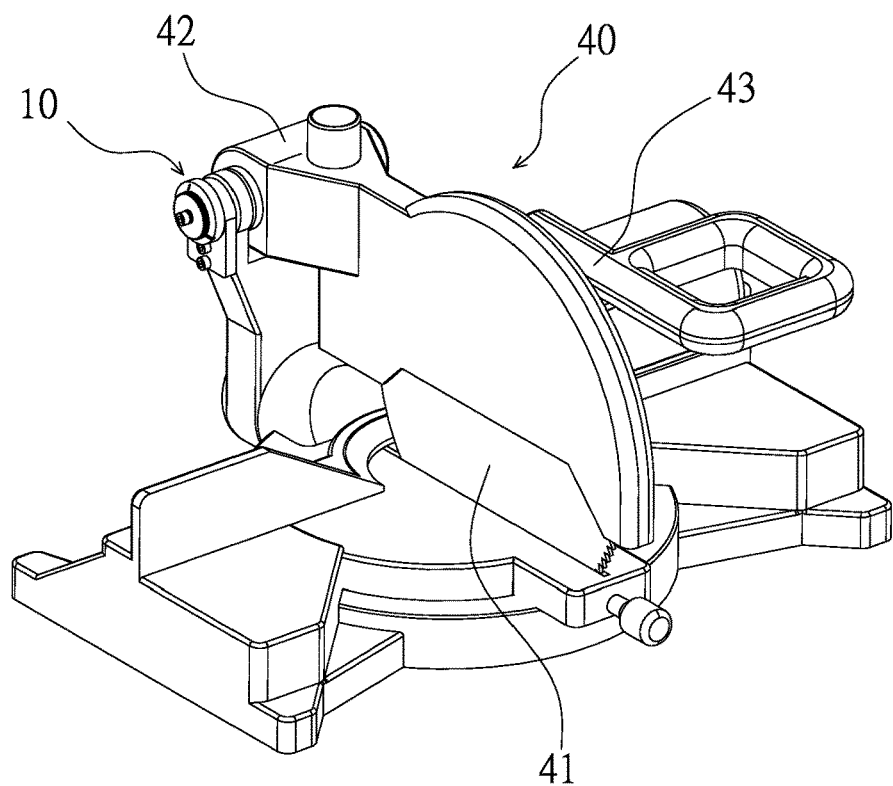
FIG. 6 is a perspective view of the present invention applied to an electric circular saw machine.
Figure 7:
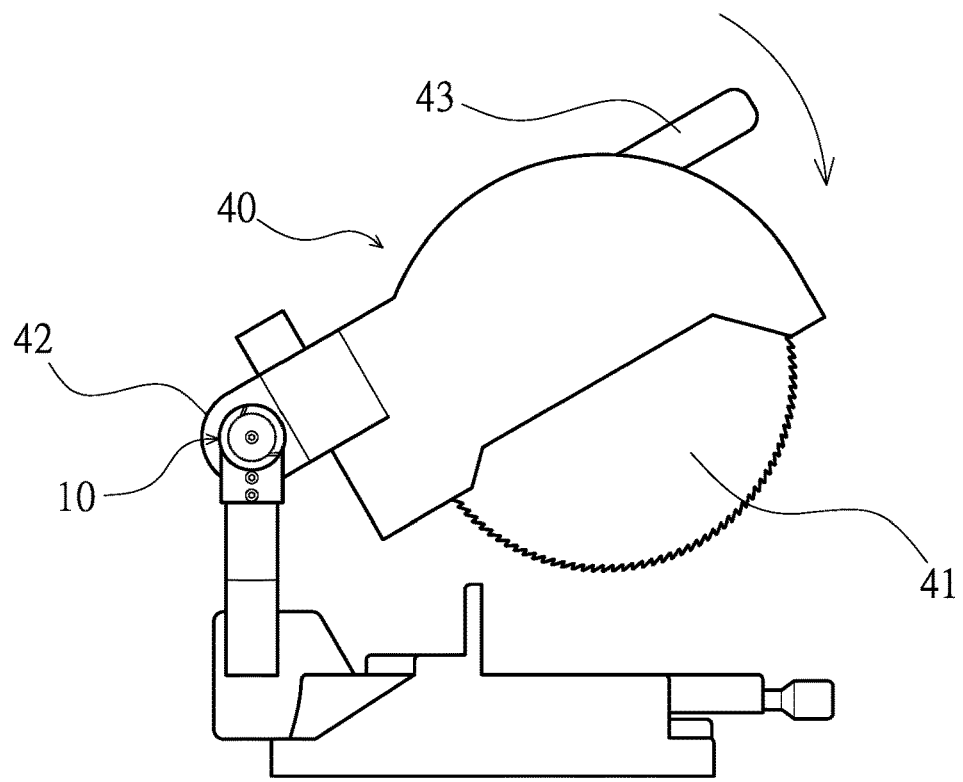
FIG. 7 is a side view of the present invention applied to the electric circular saw machine.

Referring to FIG. 2, FIG. 6 and FIG. 7, the rotating shaft structure 10 of the present invention is applied to an electric circular saw machine 40 having a manual saw arm. The electric circular saw machine 40 has a rotatable circular saw blade 41. The circular saw blade 41 is mounted on a saw arm 43 having a pivot 42. The rotating shaft structure 10 is disposed in the pivot 42. The saw arm 43 is coupled to the shaft 17 of the rotating shaft structure 10. The saw arm 43 is operated and controlled manually to rotate and press down for cutting a workpiece. When the saw arm 43 is operated manually and pressed down too fast, the rotating shaft structure 10 will have a braking effect on the pivot 42, so that the saw arm 43 cannot be quickly pressed down to cut the workpiece. It has the following advantages:

1. Safety improvement: The rotating shaft structure 10 of the present invention can slow down the downward speed of the saw arm 43 in manual operation, reducing the risk of accidental injury caused by improper operation or other reasons.
2. Improvement in cutting precision: the rotating shaft structure 10 of the present invention can restrict the downward speed of the saw arm 43, which can control the cutting depth better and improve the cutting precision.
3. Improvement in cutting quality: Because the downward speed of the saw arm 43 is slowed down, the heat generated in the cutting process and the possibility of scorching are reduced, thereby improving the cutting quality of the workpiece.

Figure 8:
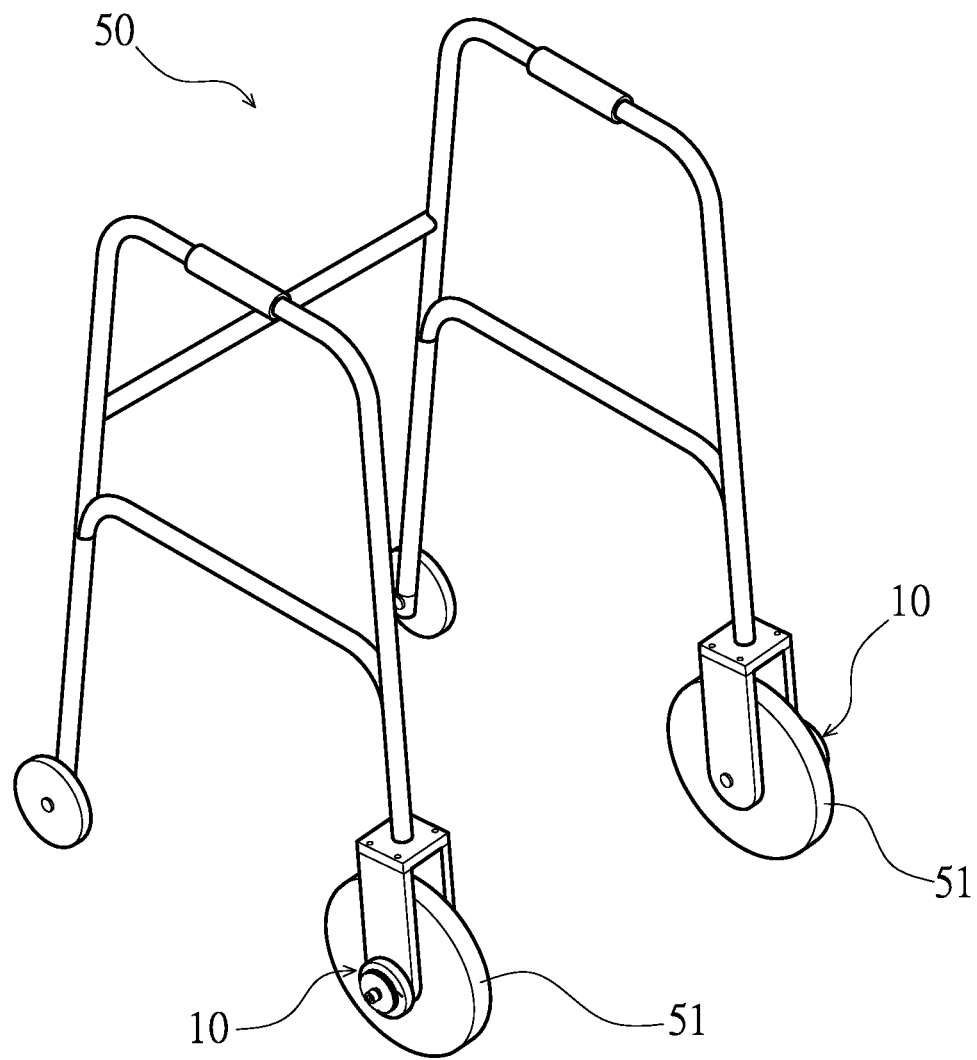
FIG. 8 is a perspective view of the present invention applied to a walking aid.

Referring to FIG. 2 and FIG. 8, the rotating shaft structure 10 of the present invention is applied to a walking aid 50 having wheels 51. The bottom of the walking aid 50 has a plurality of wheels 51, which helps the user stand. The wheels 51 are configured to help the user move and walk. The bottom ends of both sides of the walking aid 50 are provided with the rotating shaft structure 10. The shaft 17 of the rotating shaft structure 10 is coupled to the axis of the wheel 51. When the wheel 51 rotates too fast instantaneously, in other words, when the walking aid 50 is moving too fast, slipping or sliding downhill quickly, the rotating shaft structure 10 of the present invention will have a braking effect on the wheel 51, so that the wheel 51 cannot rotate. It has the following advantages:

1. Improvement in the safety of use: when the user uses the walking aid 50 to walk, if the walking aid 50 is moving too fast, slipping or sliding downhill quickly, the rotating shaft structure 10 will brake the wheel 51 to stop, reducing accidental injuries and improving the safety of using the walking aid 50.
2. Improvement in stability: With the braking effect of the rotating shaft structure 10, the user can use the walking aid 50 to stand and walk more stably, reducing the risk of falling and improving walking confidence.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A rotating shaft braking structure, comprising:
   a retaining member, having a shaft hole and an inner toothed portion on an inner peripheral edge of the shaft hole;
   a rotating shaft, including a shaft at one side thereof and an extension shaft at another side thereof, the extension shaft having two opposite drive blocks extending radially, each drive block having a fulcrum portion on an outer end thereof, the rotating shaft being pivoted in the shaft hole;
   two swing plates, arranged in a ring around the extension shaft, each swing plate having a U-like shape, each swing plate including a support portion on an inner concave side thereof and an outer toothed section on an outer convex side thereof, the fulcrum portion being embedded in the support portion, the swing plates being confined within the inner toothed portion and each having two ends able to swing freely about the fulcrum portion, each swing plate further including linking posts on two ends of one side of the swing plate, the linking posts extending in a direction same as the extension shaft;
   a brake flywheel, having an inner side and an outer side, the inner side of the brake flywheel having a receiving groove and four traction grooves corresponding to the respective linking posts, the extension shaft passing through the receiving groove and being pivotally connected to the brake flywheel so that surfaces of the drive blocks are in contact with the receiving groove and the linking posts are engaged in the respective traction grooves; the receiving groove allowing the brake flywheel to rotate forward and backward at a predetermined angle so that the traction grooves drive the respective linking posts for the outer toothed sections of the swing plates to be engaged with or disengaged from the inner toothed portion;
   an adjustment wheel; and
   a torsion spring, including a helical elastic ring, a first torsion arm and a second torsion arm, the first torsion arm and the second torsion arm extending from two ends of the elastic ring, the elastic ring of the torsion spring being arranged between the brake flywheel and the adjustment wheel, the first torsion arm being fixedly connected to the brake flywheel, the second torsion arm being fixedly connected to the adjustment wheel;
   wherein the adjustment wheel is rotated for the torsion spring to generate a torque in a direction same as a rotation direction of the rotating shaft to the brake flywheel, and the adjustment wheel and the extension shaft are connected are connected together.

2. The rotating shaft braking structure as claimed in claim 1, wherein the outer convex side of each swing plate further has an arcuate section corresponding to the support portion, the outer toothed section and a curved section are provided at two sides of the arcuate section, the curvature of the arcuate section is greater than the curvature of the inner toothed portion, and the curvature of the outer toothed section and the curved section is equal to the curvature of the inner toothed portion.

3. The rotating shaft braking structure as claimed in claim 1, wherein the outer side of the brake flywheel has a first annular groove and a first arm groove extending in a tangential direction of the first annular groove, one side of the adjustment wheel, facing the brake flywheel, has a second annular groove corresponding to the first annular groove and a second arm groove extending in a tangential direction of the second annular groove, the second arm groove is opposite to the first arm groove, the first torsion arm and the second torsion arm extend from the two ends of the elastic ring in a tangential direction of the elastic ring, the elastic ring is accommodated in the first annular groove and the second annular groove, the first torsion arm is accommodated in the first arm groove, and the second torsion arm is accommodated in the second arm groove.

4. The rotating shaft braking structure as claimed in claim 1, wherein the width of the receiving groove is greater than that of the drive block, and the cross-sectional area of the traction groove is greater than that of the linking post.

5. The rotating shaft braking structure as claimed in claim 1, wherein the drive blocks extend out of the shaft hole, and the fulcrum portion is located within the inner toothed portion.

6. The rotating shaft braking structure as claimed in claim 1, wherein one side of the adjustment wheel, facing away from the brake flywheel, is provided with a scale.

7. The rotating shaft braking structure as claimed in claim 1, wherein the extension shaft has a screw hole at one end thereof, the adjustment wheel has a central through hole, and a bolt passes through the through hole and is screwed to the screw hole for locking the adjustment wheel and the extension shaft.

8. The rotating shaft braking structure as claimed in claim 1, wherein the fulcrum portion is in an arc shape.

9. The rotating shaft braking structure as claimed in claim 1, wherein the rotating shaft includes a pivot bearing, the shaft is arranged at one side of the pivot bearing, the extension shaft and the drive blocks are arranged at another side of the pivot bearing, and the pivot bearing is assembled in the shaft hole.

10. The rotating shaft braking structure as claimed in claim 1, wherein a center of the brake flywheel is provided with a deflection bearing, a perforation is defined in the receiving groove, the perforation communicates with the deflection bearing, the extension shaft passes through the perforation and is coupled to the deflection bearing, and the first annular groove is arranged around the deflection bearing.

\* \* \* \* \*